(12) United States Patent
Kim et al.

(10) Patent No.: US 11,945,097 B2
(45) Date of Patent: Apr. 2, 2024

(54) ROBOT AND ROBOT SYSTEM COMPRISING SAME

(71) Applicant: LG ELECTRONICS INC., Seoul (KR)

(72) Inventors: Hyongguk Kim, Seoul (KR); Jaeyoung Kim, Seoul (KR); Hyoungmi Kim, Seoul (KR); Yujune Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1254 days.

(21) Appl. No.: 16/488,903

(22) PCT Filed: Jun. 3, 2019

(86) PCT No.: PCT/KR2019/006643
§ 371 (c)(1),
(2) Date: Aug. 27, 2019

(87) PCT Pub. No.: WO2020/246625
PCT Pub. Date: Dec. 10, 2020

(65) Prior Publication Data
US 2021/0331326 A1    Oct. 28, 2021

(51) Int. Cl.
| | |
|---|---|
| B01D 46/00 | (2022.01) |
| B01D 47/00 | (2006.01) |
| B01D 47/06 | (2006.01) |
| B01D 50/00 | (2022.01) |
| B01D 50/60 | (2022.01) |
| B01F 23/20 | (2022.01) |
| B01F 23/213 | (2022.01) |
| B25J 5/00 | (2006.01) |
| B25J 11/00 | (2006.01) |

(Continued)

(52) U.S. Cl.
CPC ....... *B25J 11/0085* (2013.01); *B01D 46/0002* (2013.01); *B01D 47/06* (2013.01); *B01D 50/60* (2022.01); *B01F 23/213* (2022.01); *B25J 5/007* (2013.01); *B67D 1/0004* (2013.01); *F24F 3/14* (2013.01); *F24F 8/10* (2021.01); *B67D 2210/00015* (2013.01); *B67D 2210/00136* (2013.01); *F24F 2221/125* (2013.01); *F24F 2221/18* (2013.01); *F24F 2221/42* (2013.01)

(58) Field of Classification Search
CPC ...... B01D 46/00; B01D 23/23; B01D 23/213; B01D 46/0002; B01D 50/00; B01D 50/60; B01D 47/06
See application file for complete search history.

(56) References Cited

FOREIGN PATENT DOCUMENTS

| CN | 105042714 A | * 11/2015 |
| CN | 107007149 A |   8/2017 |

(Continued)

*Primary Examiner* — Robert A Hopkins
(74) *Attorney, Agent, or Firm* — Birch, Stewart, Kolasch & Birch, LLP

(57) ABSTRACT

A robot according to an embodiment of the present invention comprises: at least one wheel for traveling; a water tank in which an accommodating space accommodating water is formed; a water pump connected to the water tank; a water purifier connected to the water pump to purify and discharge water provided from the water tank; and an air cleaner configured to suction and filter air and discharge the filtered air, wherein the water tank is disposed below the water pump, the water purifier, and the air cleaner.

6 Claims, 10 Drawing Sheets

(51) Int. Cl.
*B67D 1/00* (2006.01)
*F24F 3/14* (2006.01)
*F24F 8/10* (2021.01)

(56) References Cited

FOREIGN PATENT DOCUMENTS

| | | | | |
|---|---|---|---|---|
| CN | 108679736 A | * | 10/2018 | .............. C02F 1/001 |
| JP | 8-322776 A | | 12/1996 | |
| KR | 10-2011-0048384 A | | 5/2011 | |
| KR | 10-1074523 B1 | | 10/2011 | |
| KR | 10-2013-0125073 A | | 11/2013 | |

* cited by examiner

ROBOT AND ROBOT SYSTEM COMPRISING SAME

CROSS REFERENCE TO RELATED APPLICATIONS

This application is the National Phase of PCT International Application No. PCT/KR2019/006643, filed on Jun. 3, 2019, all of which is hereby expressly incorporated by reference into the present application.

FIELD

The present invention relates to a robot, and more particularly, to a robot capable of performing an environmental purification in a space while traveling in a predetermined space or being fixed at a predetermined position, and a robot system including the robot and a docking device.

BACKGROUND

Robots are machines that automatically process given tasks or operate with their own capabilities. The application fields of robots are generally classified into industrial robots, medical robots, aerospace robots, and underwater robots.

In recent years, the functions of robots have been expanded due to the development of autonomous navigation technology and automatic control technology using sensors. For example, robots are disposed in a large space such as an airport or a department store, and travel through the space to perform a cleaning operation or a guide operation.

Meanwhile, in the case of the large space, as many users are present, dust or contaminants on the floor surface are generated relatively more than the other spaces and the degree of drying may be high. In addition, the manager of the large space tries to keep the internal environment of the large space more comfortable so that a larger number of users visit.

SUMMARY

An object of the present invention is to implement a robot that is disposed in a public space or the like and provides various functions related to environmental purification of the space.

Another object of the present invention is to provide a robot in which configurations for providing various functions related to environmental purification are optimally arranged.

In one embodiment, a robot may include: at least one wheel for traveling; a water tank in which an accommodating space accommodating water is formed; a water pump connected to the water tank; a water purifier connected to the water pump to purify and discharge water provided from the water tank; and an air cleaner configured to suction and filter air and discharge the filtered air, wherein the water tank is disposed below the water pump, the water purifier, and the air cleaner.

The robot may further include a humidifier configured to spray water supplied from the water tank to the outside, or to vaporize the water into water vapor and discharge the vapor water, wherein the humidifier may be disposed behind the air cleaner with respect to an advancing direction of the robot.

The robot may further include: a pump channel connected between the water tank and the water pump; a purification channel connected between the water pump and the water purifier; and a humidification channel connected between the water pump and the humidifier.

The robot may further include: a motor; a first power transmission unit connected between the motor and the water pump; and a second power transmission unit connected between the motor and the air cleaner.

The robot may further include: an upper body including the water tank, the water pump, the water purifier, and the air cleaner; and a lower body provided below the upper body and including the at least one wheel and a battery.

Each of the upper body and the lower body may have a rectangular parallelepiped shape, the water purifier may be disposed on one surface of the upper body, the upper body may include a first water supply portion formed on the one surface and a second water supply portion formed on a surface opposite to the one surface, and the lower body may include a first power connection portion formed on a surface corresponding to the one surface and a second power connection portion formed on a surface corresponding to the opposite surface.

The lower body may further include a cleaning module configured to clean a floor surface, and a cleaning channel is formed between the water tank and the cleaning module.

In one embodiment, a robot system may include: a robot including a water tank, a battery, a water supply portion connected to the water tank, and a power connection portion connected to the battery; and a docking device including a water supply module connected to the water supply portion during docking of the water, and a charging module connected to the power connection portion during the docking of the robot.

The robot may include a water purifier disposed on one surface of the robot to purify and discharge water provided from the water tank, and the docking device may further include a sterilizing module configured to emit ultraviolet light to the water purifier when the one surface of the robot is docked toward the docking device.

The water supply portion may include a first water supply portion formed on the one surface and a second water supply portion formed on a surface opposite to the one surface, and the power connection portion may include a first power connection portion formed on the one surface and a second power connection portion formed on a surface opposite to the one surface.

The first water supply portion may be formed below the water purifier, and the first power connection portion may be formed below the first water supply portion.

DETAILED DESCRIPTION

Figure 1:
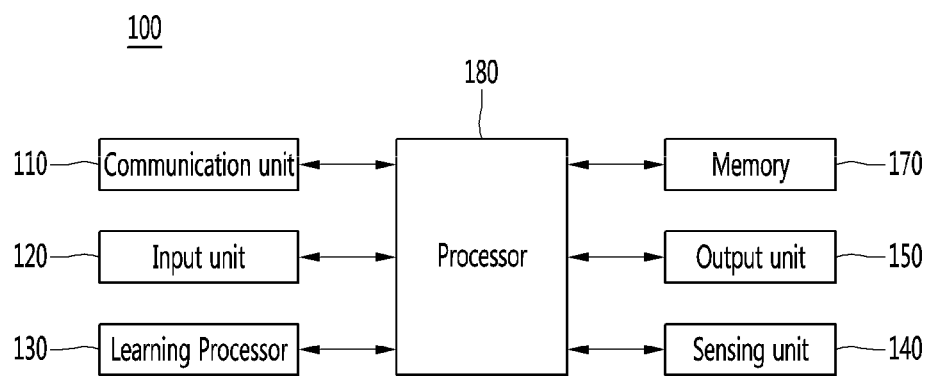
FIG. 1 illustrates an AI device including a robot according to an embodiment of the present invention.

Hereinafter, embodiments disclosed in this specification will be described in detail with reference to the accompanying drawings. The accompanying drawings are provided to facilitate the understanding of the embodiments disclosed herein, and are not intended to limit the technical idea disclosed in this specification by the attached drawings. It will be understood that the present invention is intended to cover all modifications, equivalents, and alternatives falling within the spirit and scope of the invention.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot may include a driving unit that includes an actuator or a motor and may perform various physical operations such as moving a robot joint. In addition, a movable robot may include a wheel, a brake, a propeller, and the like in a driving unit, and may travel on the ground through the driving unit or fly in the air.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 100 including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
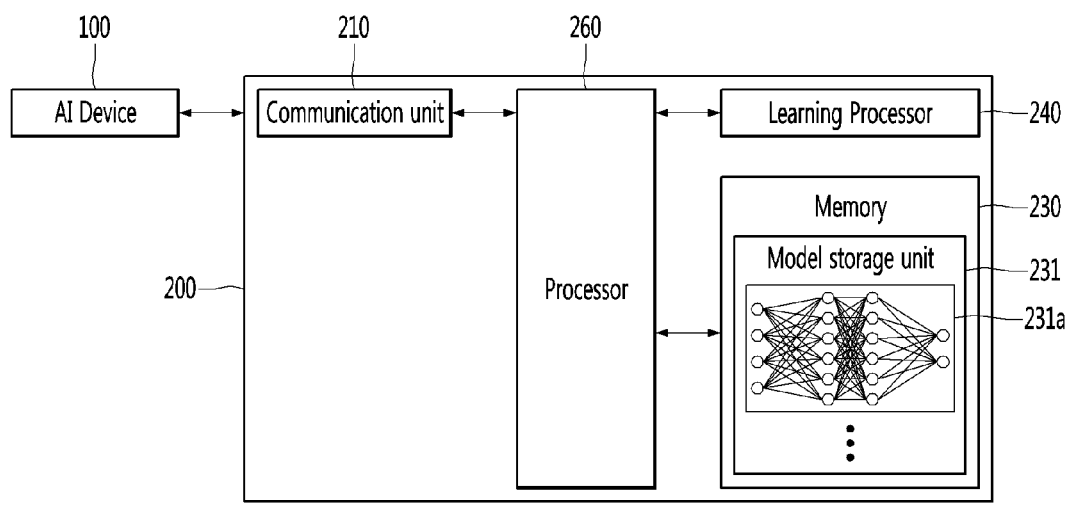
FIG. 2 illustrates an AI server connected to a robot according to an embodiment of the present invention.

FIG. 2 illustrates an AI server 200 connected to a robot according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231*a*) through the learning processor 240.

The learning processor 240 may learn the artificial neural network 231*a* by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
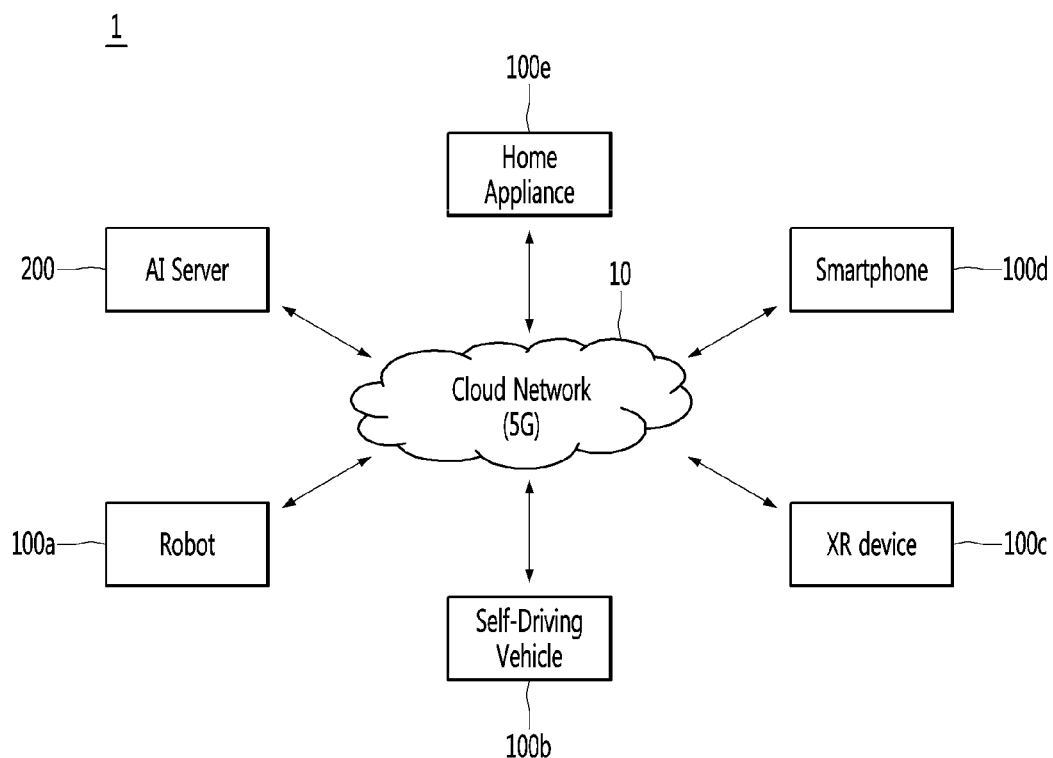
FIG. 3 illustrates an AI system according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

Figure 4:
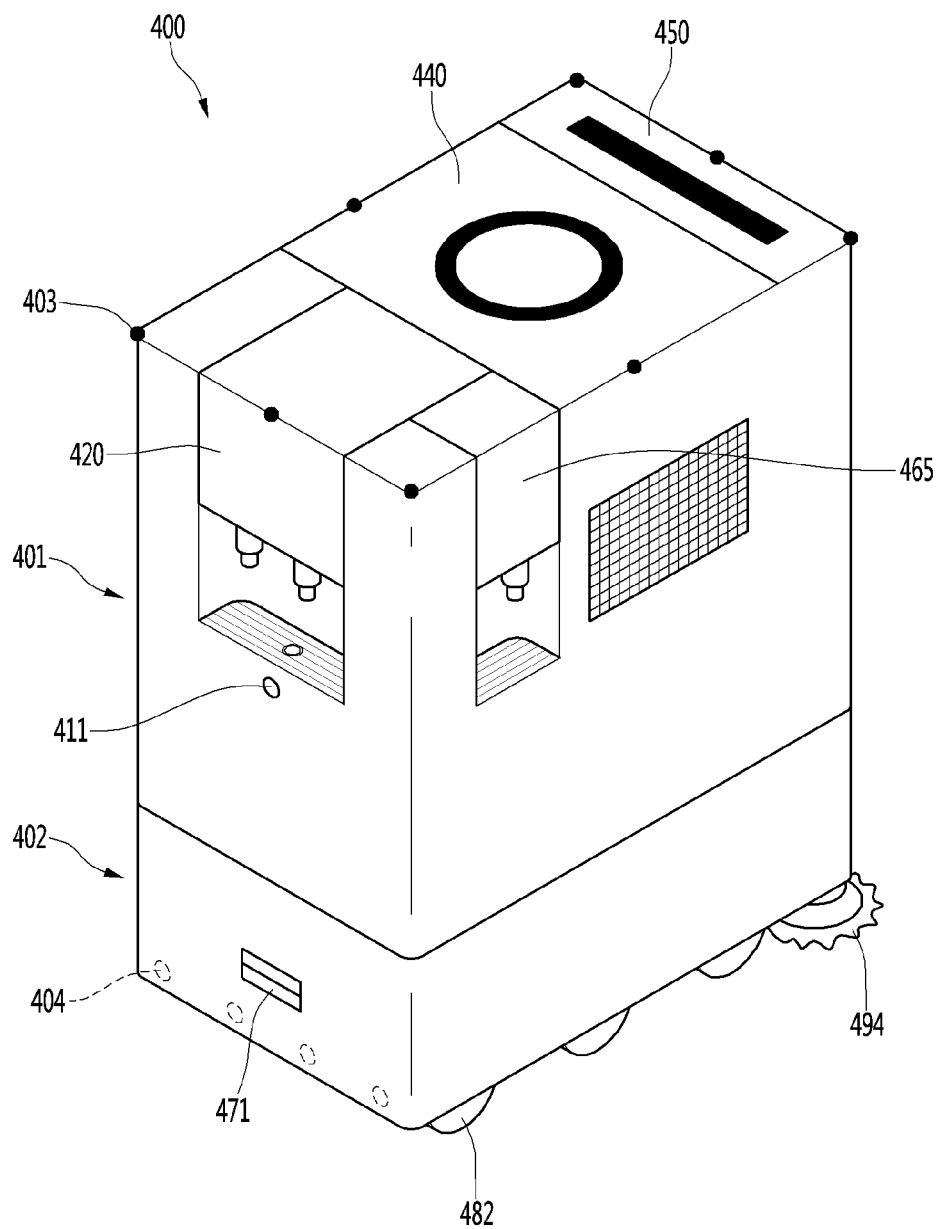
FIG. 4 is a perspective view of a robot according to an embodiment of the present invention.

FIG. 4 is a perspective view of a robot according to an embodiment of the present invention.

The shape and configuration of the robot 400 illustrated in FIGS. 4 to 11 are an example for convenience of explanation. Various embodiments described herein can be equally applied to various types of robots as well as the robot 400 having the shape and configuration.

Referring to FIG. 4, the robot 400 may be arranged in various types of spaces such as department stores, airports, and the like. The robot 400 may be installed at a predetermined position of the space, or may travel in the space.

Various configurations included in the robot 400 may be disposed in an upper body 401 or a lower body 402 of the robot 400.

Each of the upper body 401 and the lower body 402 may have a substantially rectangular parallelepiped shape. The upper body 401 may be formed on the upper side of the lower body 402 and the volume of the upper body 401 may be larger than the volume of the lower body 402, but the present invention is not necessarily limited thereto.

According to the embodiment, the upper body 401 and the lower body 402 may be integrally formed.

For example, the upper body 401 includes a water purifier 420, an air cleaner 440, a humidifier 450 to provide a function of purifying the environment of the space or to provide the convenience function to the user of the space.

In addition, the upper body 401 may have a water tank 410 (see FIG. 5) in an internal space. The water tank 410 has an accommodating space for accommodating water supplied to the water purifier 420 and the humidifier 450.

In addition, the upper body 401 may include a water supply portion 411 that communicates with the accommodating space of the water tank 410 to supply water supplied from the outside to the accommodating space. For example, the water supply portion 411 may be disposed on the surface of the upper body 401 and may be formed in a tubular shape.

The water purifier 420 may purify the water accommodated in the water tank 410 by a physical or chemical method to provide the purified water to the user. The user may approach the robot 400 to use the water purifier 420 and drink water (cold water and/or hot water) output from the water purifier 420.

The air cleaner 440 may suction air in the space, filter dust, bacteria, and other contaminants through a filter, and discharge air purified by the filtering.

The humidifier 450 is a device for maintaining the humidity of the space at an appropriate humidity. The humidifier 450 may spray the water accommodated in the water tank 410 to the outside, or evaporate the water to discharge the water in the form of water vapor.

According to the embodiment, the upper body 401 may further include a hand cleaner 465 that sprays a cleaning agent for sterilization.

According to the embodiment, the upper body 401 may include at least one proximity sensor 403 that senses the proximity of an object, such as an obstacle or a user. For example, the at least one proximity sensor 403 may be spaced apart from the upper corner portion of the upper body 401. The robot 400 may sense the proximity of the obstacle or the user based on the sensing value of each of the at least one proximity sensor 403, and may adjust the traveling direction or the traveling speed or stop traveling, based on the sensing result.

Meanwhile, the lower body 402 may include a battery for storing power required for driving the robot 400, a configuration related to the traveling of the robot 400 (for example, a wheel 482), and a cleaning module (e.g., a wet mop 494, etc.) for cleaning the floor surface of the space.

In addition, the lower body 402 may include a power connection portion 471 for receiving power from the outside to charge the battery. For example, the power connection portion 471 may include a terminal formed on the surface of the lower body 402.

According to the embodiment, the lower body 402 may include at least one traveling environment sensor 404 that senses various environmental changes associated with the traveling of the robot 400. The at least one traveling environment sensor 404 may be disposed on one surface of the lower body 402 so as to be spaced apart from each other.

For example, the traveling environment sensor 404 may sense objects around the robot 400, such as a camera, an ultrasonic sensor, or a cliff sensor, a height difference of the floor surface, or the like. The robot 400 may adjust the traveling direction or the traveling speed of the robot 400 based on the sensing value of the traveling environment sensor 404.

The configurations provided in the upper body 401 and the lower body 402 will be described later in detail with reference to FIGS. 5 to 8.

Hereinafter, with reference to the air cleaner 440, the direction in which the water purifier 420 is disposed is defined as the front of the robot 400, and the direction in which the humidifier 450 is disposed is defined as the rear of the robot 400.

The contents of the AI device 100 and the robot 100*a* described above with reference to FIGS. 1 to 3 may be equally or similarly applied to the robot 400 according to the embodiment of the present invention.

Figure 5:
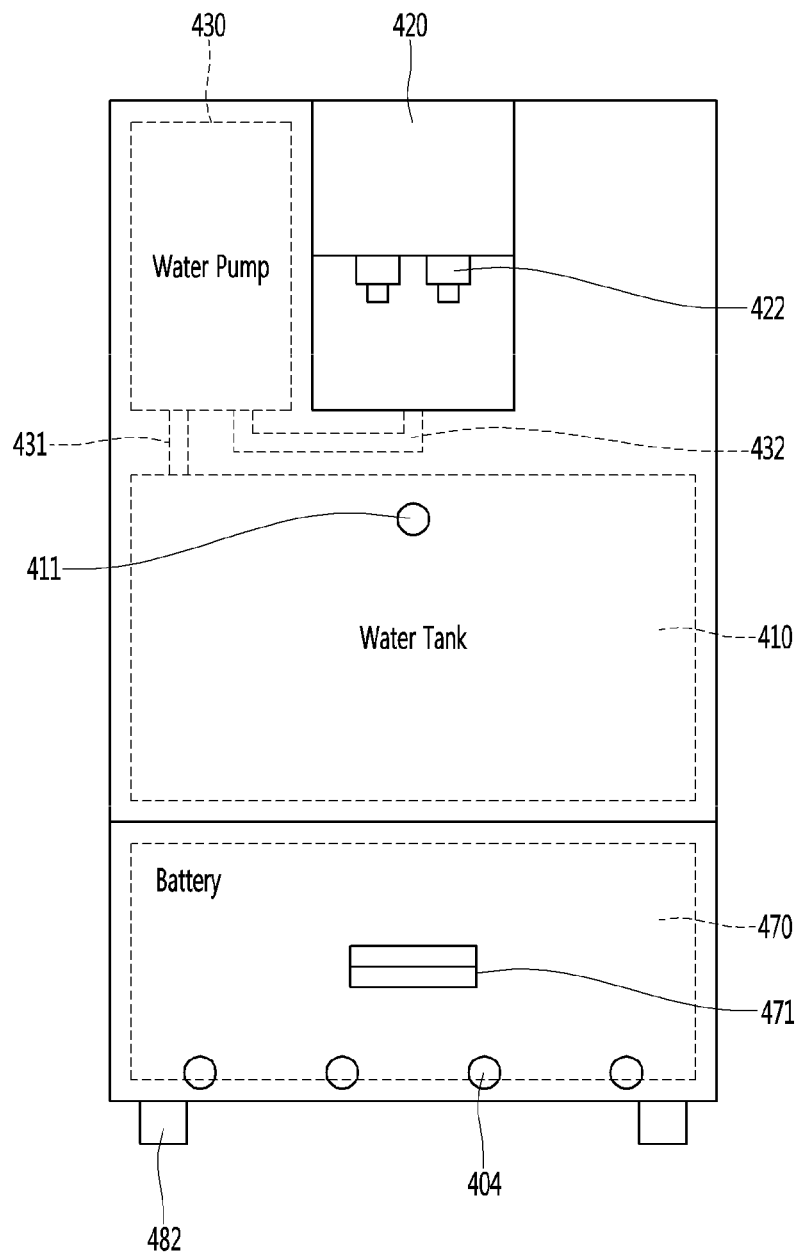
FIG. 5 is a front view of the robot according to an embodiment of the present invention.

FIG. 5 is a front view of the robot according to an embodiment of the present invention.

Referring to FIG. 5, the robot 400 may include a front water supply portion 411 and a water purifier 420 disposed on the front surface of the upper body 401.

The front water supply portion 411 may be connected to the water tank 410 provided inside the upper body 401.

Meanwhile, the water tank 410 may be disposed in a lower region adjacent to the lower body 402 in the inner space of the upper body 401. Therefore, since the center of gravity of the robot 400 is located on the lower side, the stability of the robot 400 may be improved.

The water purifier 420 may be disposed above the water tank 410 when the robot 400 is viewed from the front. For example, the water purifier 420 may include at least one water outlet 422. The at least one water outlet 422 may discharge the water filtered (purified) by the at least one filter (not illustrated) provided in the water purifier 420 according to the user's operation or the like.

According to the embodiment, the water purifier 420 may further include a temperature regulation module (not illustrated) for regulating the temperature of the filtered water. The temperature regulation module may include a heating module for raising the temperature of the water and/or a cooling module for lowering the temperature of the water.

Meanwhile, although not illustrated, when the container for containing the water output through the water outlet 422 is located, the water purifier 420 may further include a projector (not illustrated) for outputting visual information on one surface of the container. For example, the projector may include a pico projector, but the present invention is not limited thereto.

Meanwhile, the robot 400 may include a water pump 430 disposed in a region corresponding to the upper portion of the water tank 410 in the inner space of the upper body 401.

The water pump 430 may pump the water accommodated in the water tank 410 and supply the water to the water purifier 420. According to the embodiment, the water pumped by the water pump 430 may also be supplied to the humidifier 450.

During the driving of the water pump 430, the water accommodated in the water tank 410 may be moved to the water pump 430 through the pump channel 431 between the water tank 410 and the water pump 430. The water moved to the water pump 430 may be transferred to the water purifier 420 through the purified water channel 432 between the water pump 430 and the water purifier 420.

Meanwhile, the lower body 402 may include a traveling environment sensor 404 and a front power connection portion 471.

As described above, the traveling environment sensor 404 may include a camera, an ultrasonic sensor, a cliff sensor, and the like and may acquire various sensing values for controlling the traveling direction or the traveling speed of the robot 400.

The front power connection portion 471 may be connected to an external power supply unit to supply power supplied from the outside to the battery 470. The battery 470 may be electrically connected to the components included in the robot 400 to provide power required for driving the components.

Meanwhile, since the battery 470 is disposed on the lower body 402, the center of gravity of the robot 400 is located on the lower side, thereby improving the stability of the robot 400.

Figure 6:
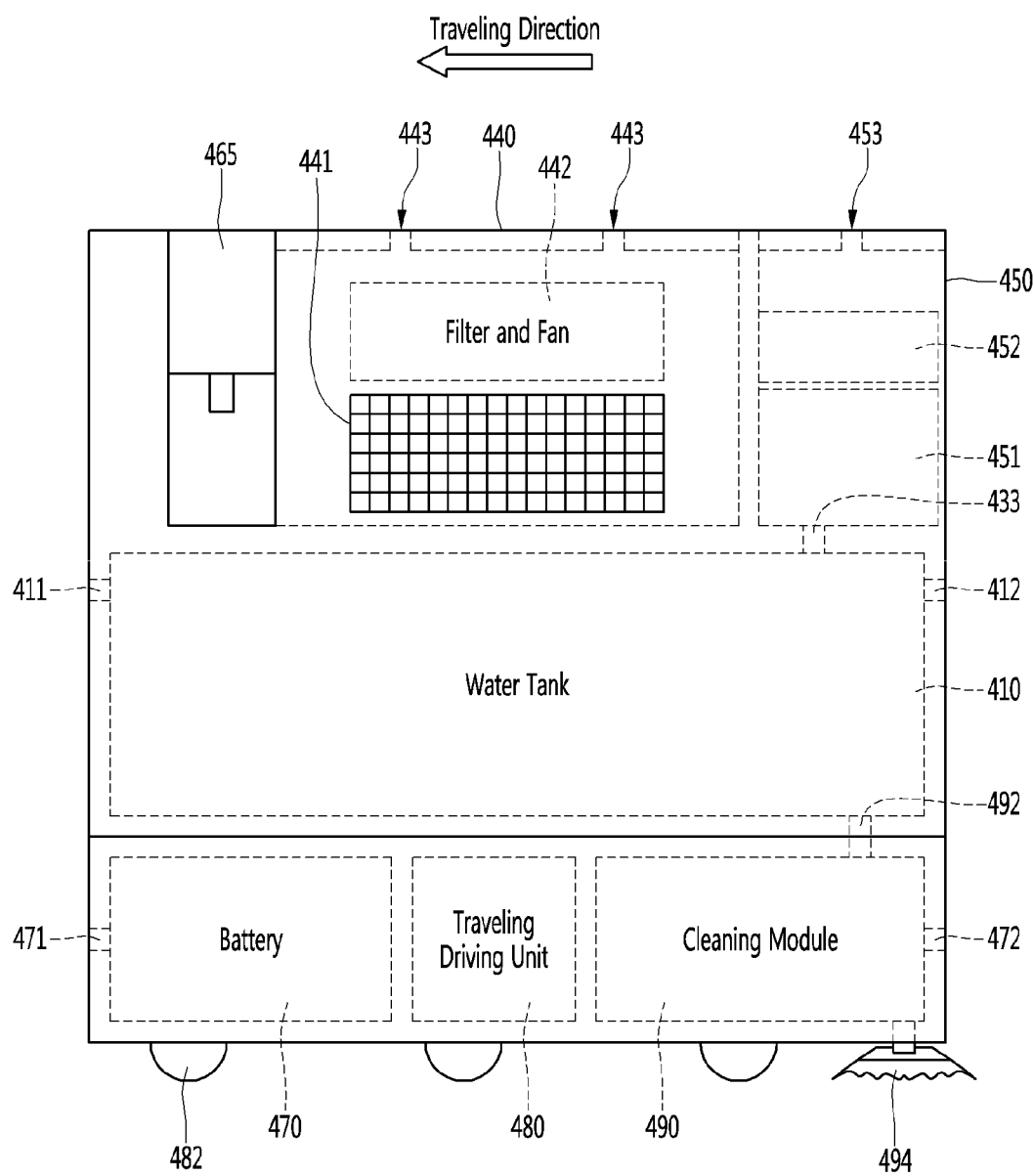
FIG. 6 is a side view of the robot according to an embodiment of the present invention.
Figure 7:
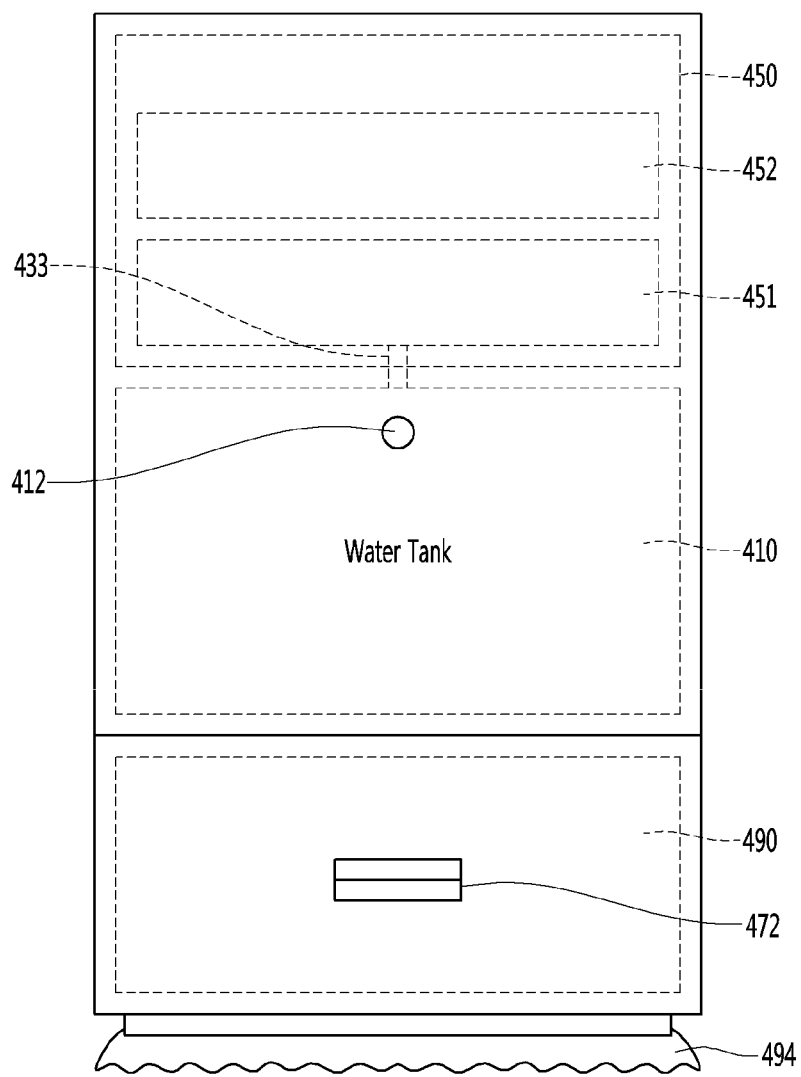
FIG. 7 is a rear view of the robot according to an embodiment of the present invention.

FIG. 6 is a side view of the robot according to an embodiment of the present invention. FIG. 7 is a rear view of the robot according to an embodiment of the present invention.

Referring to FIGS. 6 and 7, the upper body 401 may further include an air cleaner 440 and a humidifier 450 in addition to the water tank 410, the water purifier 420, and the water pump 430 described above.

The air cleaner 440 and the humidifier 450 may be disposed above the water tank 410. That is, since the water tank 410 having the largest weight among the components provided in the upper body 401 is disposed below the other components, the stability of the robot 400 may be improved as described above.

Meanwhile, the upper body 401 includes a front water supply portion 411 and a rear water supply portion 412 connected to the water tank 410. The front water supply portion 411 may be formed on the front surface of the robot 400 and the rear water supply portion 412 may be formed on the rear surface of the robot 400. Therefore, the robot 400 may be docked forward or backward with the docking device 900 (see FIG. 9) described later so as receive water.

The air cleaner 440 may include a suction port 441 for suctioning outside air, a filter and a fan 442 for filtering the suctioned air, and a discharge port 443 for discharging the filtered air.

Although not illustrated, the suction ports 441 may be provided on both side surfaces of the robot 400, respectively. The air suctioned through the suction port 441 may flow due to the rotation of the fan and may be discharged through the discharge port 443.

The humidifier 450 may include a humidification water tank 451, a humidification module 452, and a discharge port 453. The humidification water tank 451 may store water supplied from the water tank 410. The humidification water tank 451 may be connected to the water tank 410 through the humidification channel 433 to receive the water stored in the water tank 410. In FIG. 6, the humidification channel 433 is formed between the water tank 410 and the humidification water tank 451 for convenience of explanation, but the humidification channel 433 actually implemented may be formed between the water pump 430 and the humidification water tank 451. This will be described below with reference to FIG. 8. However, according to the embodiment, the humidification channel 433 may be implemented between the water tank 410 and the humidification water tank 451. In this case, the water accommodated in the water tank 410 may be moved to the humidification water tank 451 through a method such as osmosis.

The humidification module 452 may spray the water stored in the humidification water tank 451 to the outside through the discharge port 453, or may vaporize the water into water vapor and discharge the water vapor through the discharge port 453 to the outside. The humidification module 452 may provide a humidification function of the humidifier 450 according to at least one of known methods such as a heating method, an ultrasonic method, a centrifugal spray method, and a filter evaporation method.

Meanwhile, when the water vapor discharged from the humidifier 450 is suctioned into the air cleaner 440, the moisture in the filter in the air cleaner 440 may increase. In this case, various bacteria such as fungi may be generated in the filter or the air cleaner 440, deteriorating the performance of the air cleaner 440. In order to prevent this, the humidifier 450 is disposed behind the air cleaner 440 with respect to the traveling direction (advancing direction) of the robot 400 to prevent the water vapor from being suctioned into the air cleaner 440.

According to the embodiment, the upper body 401 may further include a hand cleaner 465. The hand cleaner 465 may be provided in a region corresponding to one side of the water purifier 420 (e.g., the opposite side of the water pump 430) and a region corresponding to the front of the air cleaner 440.

Meanwhile, the lower body 402 may include a battery 470, a driving unit 480, and a cleaning module 490. The positional relationship between the battery 470, the driving unit 480, and the cleaning module 490 may be variously changed.

The lower body 402 may include a front power connection portion 471 and a rear power connection portion 472 connected to the battery 470. The front power connection portion 471 may be formed on the front surface of the robot 400 and the rear power connection portion 472 may be formed on the rear surface of the robot 400. Therefore, the robot 400 may be docked forward or backward to the docking device 900 (see FIG. 9) described later so as to receive power.

The traveling driving unit 480 may include a traveling motor (not illustrated) that provides a rotational force to the at least one wheel 482. The robot 400 may control the traveling motor according to a predetermined traveling algorithm. Furthermore, the robot 400 may control the traveling motor to adjust the traveling direction and/or the traveling speed based on the sensing values of the proximity sensor 403 and the traveling environment sensor 404.

The cleaning module 490 may perform a cleaning operation on the floor surface of the space where the robot 400 travels. For example, the cleaning module 490 may include various types of cleaning means for performing an appropriate cleaning operation according to the type of the floor surface or the type of contaminants present on the floor surface. For example, the cleaning module 490 may include a brush, a wet mop 494, a suction motor, and the like.

Meanwhile, when the cleaning module 490 includes the wet mop 494, a cleaning channel 492 may be formed between the water tank 410 and the cleaning module 490. The wet mop 494 may perform a floor surface cleaning operation by using water supplied through the cleaning channel 492.

Figure 8:
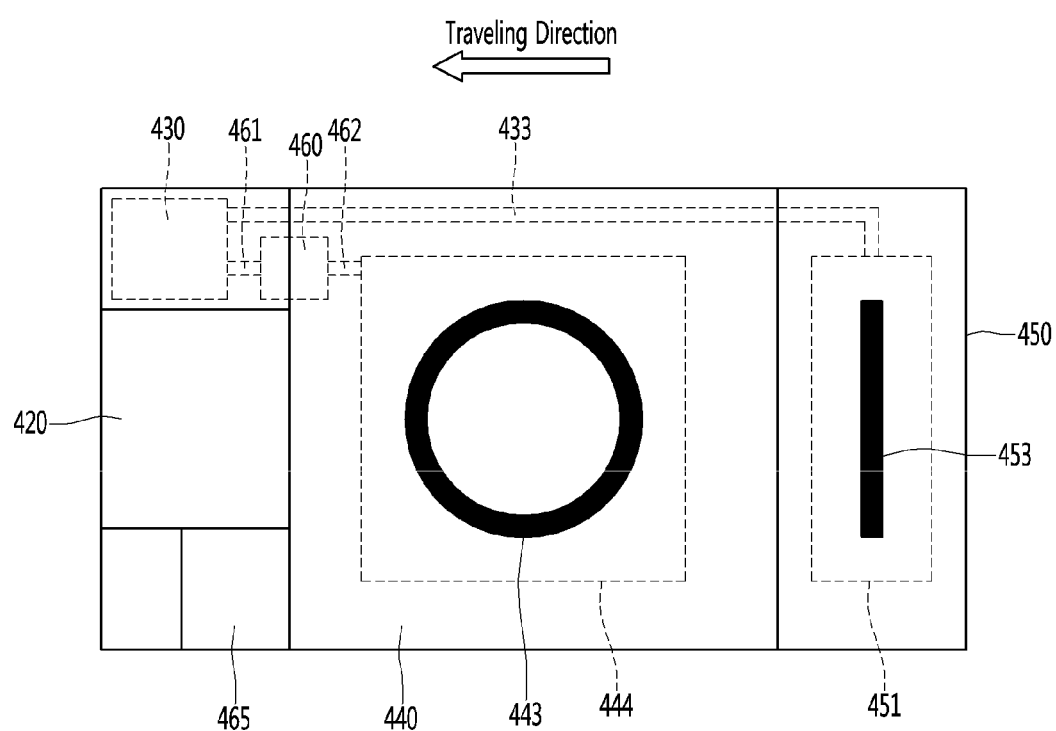
FIG. 8 is a plan view of the robot according to an embodiment of the present invention.

FIG. 8 is a plan view of the robot according to an embodiment of the present invention.

Referring to FIG. 8, the robot 400 may include a water pump 430 and a motor 460 for driving the fan 444 of the air cleaner 440.

In particular, the robot 400 may include a first power transmission unit 461 connected between the motor 460 and the water pump 430, and a second power transmission unit 462 connected between the motor 460 and the fan 444. For example, each of the first power transmission unit 461 and the second power transmission unit 462 may be constituted by at least one power transmitting means such as a gear and/or a belt.

Since the first power transmission unit 461 and the second power transmission unit 462 are provided, the robot 400 may drive the water pump 430 and the air cleaner 440 by using one motor 460. Furthermore, as the water pump 430 is driven, the water accommodated in the water tank 410 may be supplied to the water purifier 420 through the purified water channel 432 and may be provided to the humidifier 450 through the humidification channel 433.

That is, the robot 400 may drive the water purifier 420, the air cleaner 440, and the humidifier 450 by using one motor 460. Therefore, compared with the case where the motor is provided in each of the water pump 430 and the air cleaner 440, the structure of the robot 400 may be simplified and the volume of the robot 400 is also reduced, thereby realizing a more compact robot 400.

Figure 9:
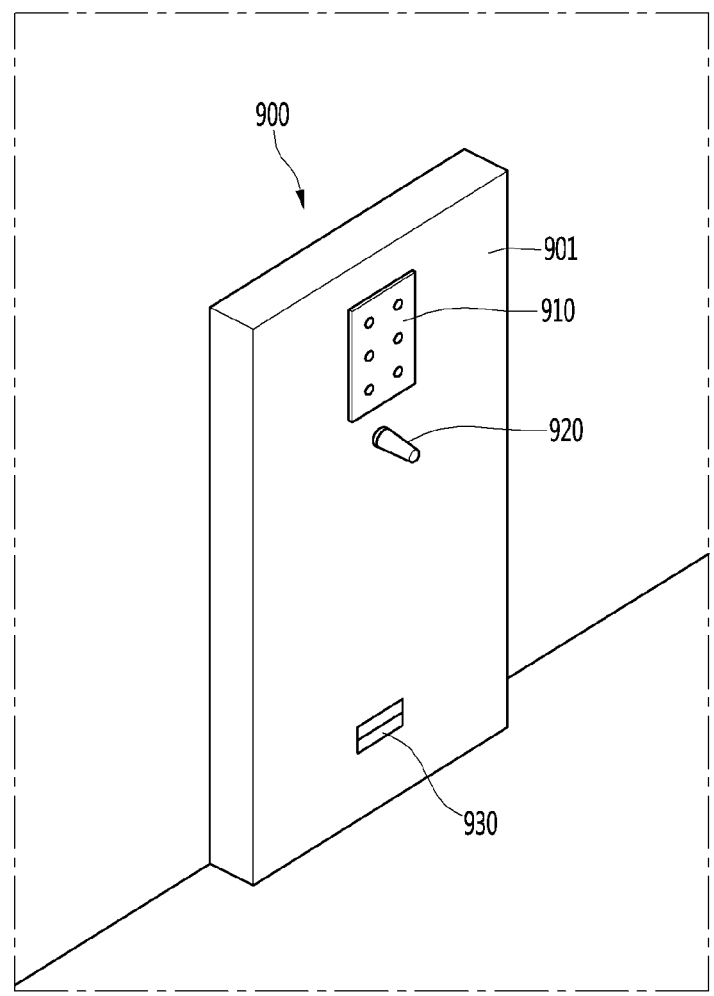
FIG. 9 is a perspective view of a docking device related to the robot according to an embodiment of the present invention.

FIG. 9 is a perspective view of a docking device related to the robot according to an embodiment of the present invention.

Referring to FIG. 9, the docking device 900 may be provided in a fixed form on a wall surface at a predetermined position in a space where the robot 400 is disposed.

The docking device 900 may include a body portion 901 forming an overall appearance, a sterilizing module 910, a water supply module 920, and a charging module.

The sterilizing module 910 may include at least one ultraviolet light source that performs a sterilizing operation on the purifier 420 of the robot 400. For example, the at least one ultraviolet light source may include a UV lamp or a UV LED.

Meanwhile, only when the front surface of the robot 400 is docked to the docking device 900, the sterilizing module 910 may be activated to emit ultraviolet light. This will be described below with reference to FIG. 11.

The water supply module 920 may be connected to an external water supply source to supply water to the water tank 410 of the robot 400. Specifically, when the robot 400 is docked to the docking device 900, the front water supply portion 411 or the rear water supply portion 412 may be connected to the water supply module 920. The water supply module 920 may be connected to the front water supply portion 411 or the rear water supply portion 412 such that the water supplied from the external water supply source is introduced into the water tank 410.

The charging module 930 may be connected to an external power source (such as a commercial power source) to supply power to the battery 470 of the robot 400. Specifically, when the robot 400 is docked to the docking device 900, the front power connection portion 471 or the rear power connection portion 472 may be connected to the charging module 930. When the charging module 930 is connected to the front power connection portion 471 or the rear power connection portion 472, the power supplied fro the external power supply source may be provided to the battery 470.

That is, the robot 400 may be docked to the docking device 900 by connecting the front water supply portion 411 to the water supply module 920 and the front power connection portion 471 to the charging module 930. Alternatively, the robot 400 may be docked to the docking device 900 by connecting the rear water supply portion 412 to the water supply module 920 and the rear power connection portion 472 to the charging module 930.

Figure 10:
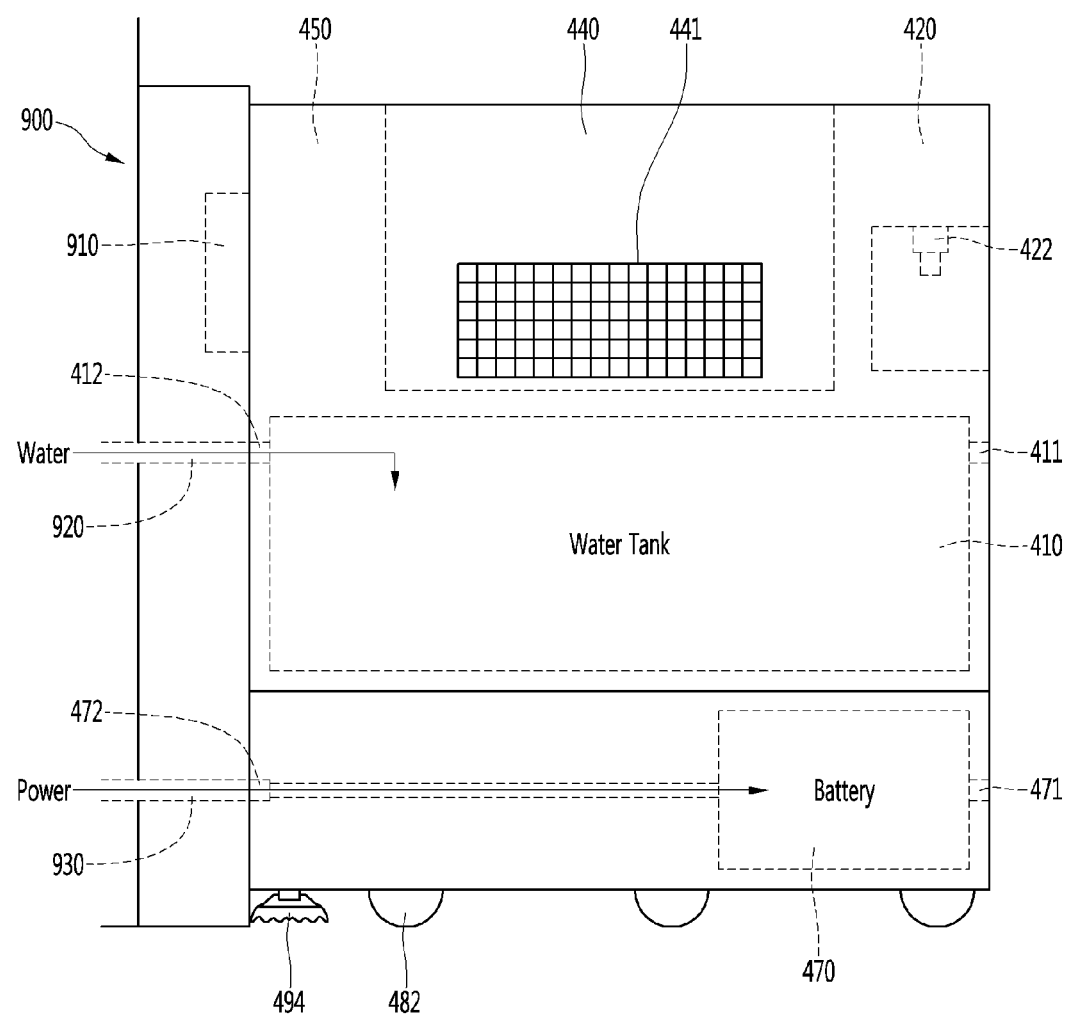
FIG. 10 illustrates a state in which the robot is docked to the docking device in a first direction, according to an embodiment of the present invention.
Figure 11:
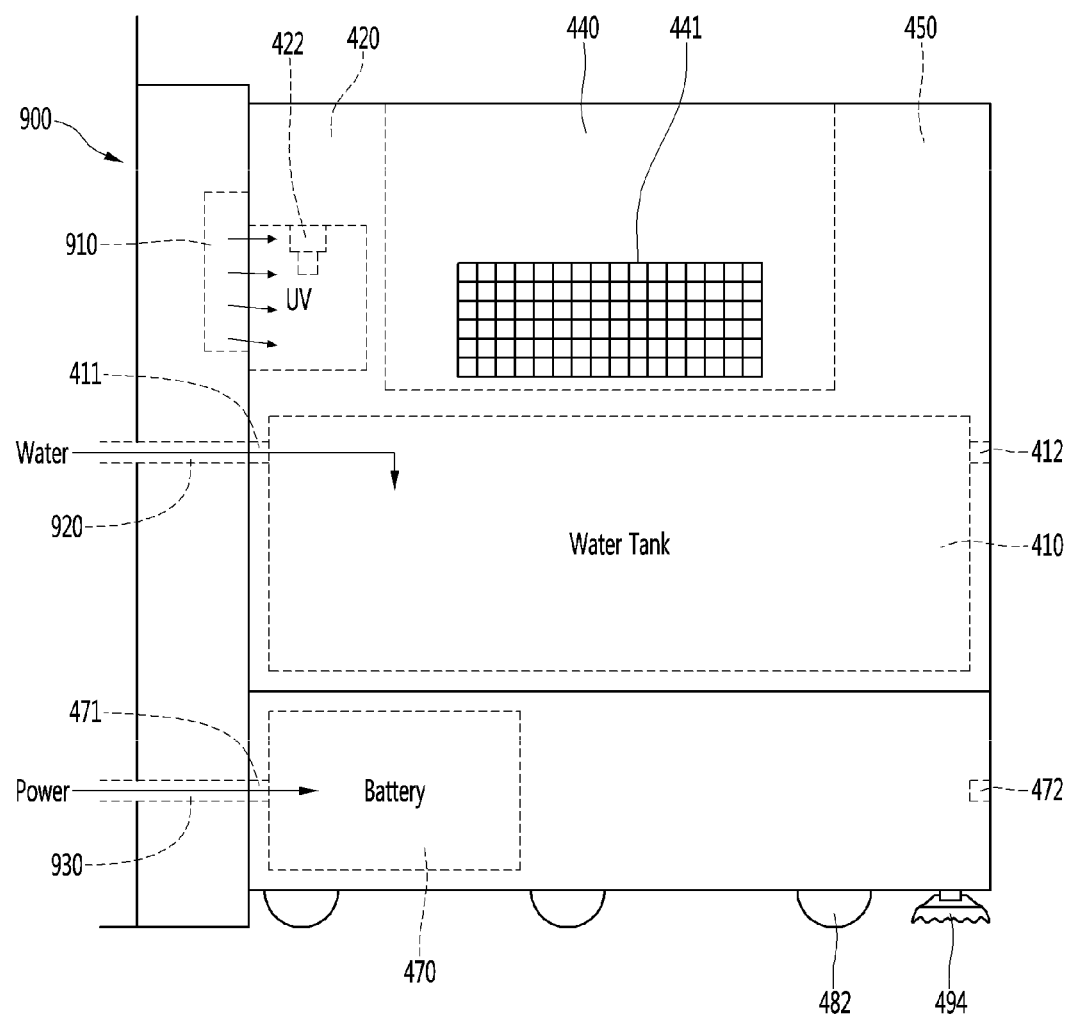
FIG. 11 illustrates a state in which the robot is docked to the docking device in a second direction, according to an embodiment of the present invention.

FIG. 10 illustrates a state in which the robot is docked to the docking device in a first direction, according to an embodiment of the present invention. FIG. 11 illustrates a state in which the robot is docked to the docking device in a second direction, according to an embodiment of the present invention.

Since the robot 400 according to the embodiment of the present invention may be understood as an embodiment of the AI device 100 described above with reference to FIG. 1, the robot 400 may include at least one of the components 110, 120, 130, 140, 150, 170, and 180 illustrated in FIG. 1.

Referring to FIGS. 10 and 11, the processor 180 (see FIG. 1) of the robot 400 may recognize that water supply or charging is necessary when the remaining amount of water accommodated in the water tank 410 is less than a reference amount or when the amount of electricity stored in the battery 470 is less than a reference amount of electricity.

Based on the recognition result, the processor 180 may control the traveling driving unit 480 to move to the docking device 900 provided in the space. For example, the processor 180 may control the traveling driving unit 480 based on the current position information of the robot 400, map data of the space, and positional information of the docking device 900 on the map data.

When the robot 400 approaches the docking device 900 within a predetermined distance, the processor 180 may perform precise traveling control for docking the robot 400 by using the sensing value of the traveling environment sensor 404 or the like.

For example, the robot 400 may be docked such that the rear surface thereof faces the docking device 900, as illustrated in FIG. 10.

In this case, the rear water supply portion 412 formed on the rear surface of the robot 400 may be connected to the water supply module 920 of the docking device 900, and the rear power connection portion 472 may be connected to the charging module 930. As the rear water supply portion 412 is connected to the water supply module 920, water may be supplied to the water tank 410 from the external water supply source. As the rear power connection portion 472 is connected to the charging module 930, power may be supplied from the external power source to the battery 470.

Meanwhile, when the rear surface of the robot 400 is docked toward the docking device 900, the sterilizing module 910 may be inactivated.

For example, the robot 400 and the docking device 900 may be communicatively connected to each other directly or via another device. When the rear surface of the robot 400 is docked toward the docking device 900, the processor 180 of the robot 400 may transmit, to the docking device 900, a signal for deactivating the sterilizing module 910. The docking device 900 may deactivate the sterilizing module 910 based on the received signal.

According to the embodiment, the docking device 900 may include a sensor for sensing the docking direction of the robot 400. The sterilizing module 910 may be activated or deactivated based on the sensing result of the sensor.

When the rear surface of the robot 400 is docked toward the docking device 900, the water purifier 420 may maintain an opened state. Therefore, the users of the space may freely use the water purifier 420.

Meanwhile, the robot 400 may be docked such that the front surface thereof faces the docking device 900, as illustrated in FIG. 11.

In this case, the front water supply portion 411 formed on the front surface of the robot 400 may be connected to the water supply module 920 of the docking device 900, and the front power connection portion 471 may be connected to the charging module 930. As the front water supply portion 411 is connected to the water supply module 920, water may be supplied to the water tank 410 from the external water supply source. As the front power connection portion 471 is connected to the charging module 930, power may be supplied from the external power source to the battery 470.

Meanwhile, when the front surface of the robot 400 is docked toward the docking device 900, the sterilizing module 910 may be activated to perform a sterilizing operation for the water outlet 422 of the water purifier 420 and the like.

For example, when the front surface of the robot 400 is docked toward the docking device 900, the processor 180 of the robot 400 may transmit, to the docking device 900, a signal for activating the sterilizing module 910. The docking device 900 may activate the sterilizing module 910 based on the received signal.

According to the embodiment, the docking device 900 may activate or deactivate the sterilizing module 910 based on the sensing result of the sensor that senses the docking direction of the robot 400.

That is, the robot 400 may sterilize the water purifier 420 according to the docking direction to the docking device 900, or may allow the user to freely use the water purifier 420.

In addition, since the robot 400 includes the water supply portions 411 and 412 and the power connection portions 471 and 472 on the front and rear sides, respectively, the water supply and the filling may be smoothly performed in each of a state in which the water purifier 420 is sterilized and a state in which the water purifier 420 is opened.

According to an embodiment of the present invention, a robot includes various devices such as a water purifier, an air purifier, a humidifier, and a cleaning module, thereby providing various environmental purification and convenience functions for a space in which the robot is disposed.

In addition, the robot may place the center of gravity in the lower side by disposing the water tank and the battery below the water purifier, the air purifier, and the humidifier. Therefore, the stability of the robot when traveling or when an external force is applied may be improved.

In addition, the humidifier may be disposed behind the air purifier with respect to the traveling (advancing) direction of the robot. Therefore, since steam discharged from the humidifier is suctioned by the air cleaner, contamination inside the air cleaner and deterioration of the performance of the air cleaner may be prevented.

Furthermore, the robot may drive fans of the water pump and the air purifier with one motor. Therefore, the structure of the robot may be simplified, and a compact robot may be implemented through a reduction in volume.

The above description is merely illustrative of the technical idea of the present invention, and various modifications and changes may be made thereto by those skilled in the art without departing from the essential characteristics of the present invention.

Therefore, the embodiments of the present invention are not intended to limit the technical spirit of the present invention but to illustrate the technical idea of the present invention, and the technical spirit of the present invention is not limited by these embodiments.

The scope of protection of the present invention should be interpreted by the appending claims, and all technical ideas within the scope of equivalents should be construed as falling within the scope of the present invention.

What is claimed is:

1. A robot comprising:
   at least one wheel for traveling;
   a water tank in which an accommodating space accommodating water is formed;
   a water pump connected to the water tank;
   a water purifier connected to the water pump to purify and discharge water provided from the water tank;
   an air cleaner configured to suction and filter air and discharge the filtered air;
   a motor;
   a first power transmission unit connected between the motor and the water pump; and
   a second power transmission unit connected between the motor and the air cleaner,
   wherein the water tank is disposed below the water pump, the water purifier, and the air cleaner.

2. The robot according to claim 1, further comprising a humidifier configured to spray water supplied from the water tank to the outside, or to vaporize the water into water vapor and discharge the water vapor,
   wherein the humidifier is disposed behind the air cleaner with respect to an advancing direction of the robot.

3. The robot according to claim 2, further comprising:
a pump channel connected between the water tank and the water pump;
a purification channel connected between the water pump and the water purifier; and
a humidification channel connected between the water pump and the humidifier.

4. A robot comprising:
at least one wheel for traveling;
a water tank in which an accommodating space accommodating water is formed;
a water pump connected to the water tank;
a water purifier connected to the water pump to purify and discharge water provided from the water tank;
an air cleaner configured to suction and filter air and discharge the filtered air;
an upper body comprising the water tank, the water pump, the water purifier, and the air cleaner; and
a lower body provided below the upper body and comprising the at least one wheel and a battery,
wherein the water tank is disposed below the water pump, the water purifier, and the air cleaner.

5. The robot according to claim 4, wherein the each of the upper body and the lower body has a rectangular parallelepiped shape,
wherein the water purifier is disposed on a first surface of the upper body,
wherein the upper body comprises a first water supply portion formed on the first surface and a second water supply portion formed on a second surface opposite to the first surface, and
wherein the lower body comprises a first power connection portion formed on a first surface corresponding to the first surface of the upper body and a second power connection portion formed on a second surface corresponding to the second surface of the upper body.

6. The robot according to claim 4, wherein the lower body further comprises a cleaning module configured to clean a floor surface, and
wherein a cleaning channel is formed between the water tank and the cleaning module.

* * * * *